United States Patent

Diekhans

[19]

[11] Patent Number: 6,067,782
[45] Date of Patent: May 30, 2000

[54] ELECTROHYDRAULIC STEERING SYSTEM

[75] Inventor: Norbert Diekhans, Gütersloh, Germany

[73] Assignee: CLAAS KGaA, Harsewinkel, Germany

[21] Appl. No.: 09/016,136

[22] Filed: Jan. 30, 1998

[30] Foreign Application Priority Data

Feb. 1, 1997 [DE] Germany .......................... 197 03 846

[51] Int. Cl.⁷ .................................................. B62D 5/00
[52] U.S. Cl. ...................................... 56/10.2 A; 180/79.1
[58] Field of Search ........................... 56/10.2 R, 10.2 A,
56/10.2 F, 15.4, 341; 180/9.46, 441, 422,
434, 446; 91/471, 361

[56] References Cited

U.S. PATENT DOCUMENTS

| | | | |
|---|---|---|---|
| 4,263,979 | 4/1981 | Sturgill | 180/79.1 |
| 5,303,636 | 4/1994 | Stephenson et al. | 91/471 |
| 5,785,144 | 7/1998 | Cakmaz et al. | 180/422 |

FOREIGN PATENT DOCUMENTS

| | | | |
|---|---|---|---|
| 18 06 699 | 6/1969 | Germany . | |
| 19 28 065 | 5/1970 | Germany | A01D 73/00 |
| 21 50 298 | 5/1972 | Germany | B62D 5/00 |
| 30 45 250 | 9/1981 | Germany | B62D 5/32 |
| 237 639 | 7/1986 | Germany | B62D 6/00 |
| 40 25 697 | 2/1992 | Germany | B62D 1/24 |
| 92 05 781 | 7/1992 | Germany | B62D 6/00 |
| 42 07 719 | 9/1993 | Germany | B62D 6/00 |
| 42 41 849 | 6/1994 | Germany | B62D 5/04 |
| 44 09 892 | 9/1995 | Germany | G01B 21/22 |
| 195 07 957 | 9/1996 | Germany | G01S 17/88 |

OTHER PUBLICATIONS

Moller, Rudolf: Vehicle Steering Systems For Manual and Automatic Operation. Olhydraulik and Pneumatik 17, 1973, No. 8, pp. 225–228.

Branneby, Per; Isaksson, Ander; and Franzen, Stig: Improved Active and Passive Safety by Using Active Lateral Dynamic Control and an Unconventional Steering Unit. 13th International Technical Conference on Experimental Safety Vehicles, Proceedings, vol. 1, 4, Nov. 7, 1991, Figure 4.

*Primary Examiner*—Robert E. Pezzuto
*Attorney, Agent, or Firm*—Husch & Eppenberger, LLC; Robert E. Muir

[57] ABSTRACT

An electrohydraulic steering system for machines includes manual steering and automatic steering (autopilot) modes which can be activated by a switch (3). The system has a hydraulic steering cylinder (6) for displacement of the steerable wheels, at least one sensor (7) for determining the wheel angle actual values ($\delta_w$), at least one electrically operated hydraulic control valve (5) which regulates admission of hydraulic fluid to the steering cylinder (6) and at least one automatic steering signal transmitter (2) for generating electrical steering signal nominal values ($\delta_{s2}$) for the wheel angles. An electronic control and analysis device (4) is fed the automatically generated steering signal nominal values ($\delta_{s2}$) and the wheel angle actual values ($\delta_w$). The control and analysis device (4) determines an electrical trigger signal (4S) for the hydraulic control valve (5) from the wheel angle actual value ($\delta_w$) and the automatically generated steering signal nominal value ($\delta_{s2}$). A steering signal transmitter (1) is provided for the manual steering, which from a manual steering movement generates a corresponding electrical steering signal nominal value ($\delta_{s1}$) which is also fed to the control and analysis device (4). Depending on which steering mode is active, the control and analysis device (4) analyses the manual or automatic steering signal nominal values.

50 Claims, 7 Drawing Sheets

ELECTROHYDRAULIC STEERING SYSTEM

BACKGROUND OF THE INVENTION

The present invention relates generally to a steering system and, more particularly to an electrohydraulic steering system for agricultural machines (e.g. tractors, forage harvesters or combine harvesters).

A known steering system is used on forage harvesters for the corn crop. That steering system includes an automatic steering mode (autopilot) to facilitate and optimize working in the field, and a manual steering mode via a steering wheel for road travel. The automatic steering has mechanically deflectable switches as automatic steering signal transmitters for orientation when driving in the rows of corn. An electrical steering signal nominal value is generated each time upon deflection by contact with the corn stalks. This steering signal nominal value is fed to an electronic control and analysis device. At the same time the control and analysis device also receives a wheel position, or steering angle, signal actual value of the steered wheels as determined by a sensor. The control and analysis device compares the wheel position actual value with the automatically generated steering signal nominal value and generates a trigger signal for an electrically operated hydraulic control valve to regulate flow of hydraulic fluid to the steering cylinder which moves the steerable wheels. Thus the steerable wheels are moved or steered by the steering cylinder according to the automatically generated steering signal nominal values in such a way that the machine moves optimally along the corn rows for harvesting use.

The manual steering of the forage harvester is a so-called hydrostatic steering system of rotary slide valve design. Turning the steering wheel rotates the rotary slide valve which is mechanically coupled to the steering shaft, and opens a control port which releases flow of hydraulic fluid to the steering cylinder.

However, such hydrostatic manual steering has some drawbacks. First the design is relatively elaborate because, on account of the relatively long distance between the steering wheel/steering shaft and the axle where the steering cylinder is located, correspondingly long hydraulic pipes have to be installed. Second, on account of the necessarily existing overlap of the rotary slide valve for the control port, hydrostatic steering has a relatively high steering play of up to ±5°. Further there is a time delay between the start of steering wheel movement and the steering cylinder movement. This, when added to the amount of the above-mentioned steering play, creates a dynamic behavior which is difficult to influence given the nature of the hydraulic circuitry and the hydraulic components used. Optimization can be obtained only with difficulty by adjustment of the hydraulic components.

The dynamic behavior is such that it is difficult for the operator to drive exactly straight ahead, which at relatively high travelling speeds places high demands on the operator's abilities.

It is an object of the present invention to provide a steering system which overcomes one or more of the above described problems in the prior art. It is another object to provide a steering system having manual and automatic steering modes which is structurally simplified and at the same time reliable in use.

SUMMARY OF THE INVENTION

An object of the invention is achieved by an electrohydraulic steering system for machines which has manual steering and automatic steering (autopilot) modes which can be selectively activated, a manual steering signal transmitter is operative in the manual steering mode for sensing manual steering movements and generating a corresponding manual steering signal nominal value, means is provided for feeding the manual steering signal nominal value to a control and analysis device which determines, using a wheel angle actual value and the manual steering signal nominal value, a manual steering mode electrical trigger signal for regulating flow of hydraulic fluid to a steering cylinder.

According to the invention, with the electrohydraulic steering system for machines which have both a manual steering mode and an automatic steering mode, a steering signal transmitter is provided for the manual steering. Preferably there is a steering wheel with an electronic rotary angle transmitter for measuring the steering wheel angle, which responds to a manual adjusting movement to generates a corresponding electrical steering signal nominal value. This steering signal nominal value is then—like the automatic steering signal nominal value—fed to a control and analysis device which also value receives the wheel angle actual values. The control and analysis device then compares the wheel angle actual value with the manually generated steering signal nominal value and determines, with the aid of an implemented control algorithm, an electrical trigger signal for a hydraulic control valve.

Preferably the same control and analysis device is used in both the manual steering operation and the automatic steering operation.

With the steering system according to the invention, both the automatic steering operation and the manual steering operation are initiated by an electrical signal.

The foregoing simplifies the design considerably as compared with previously used steering systems designed for both manual and automatic steering operations. The electrically operated hydraulic control valve can be arranged in the immediate vicinity of the steering axle with the steering cylinder. Long hydraulic pipes from the steering wheel are eliminated. Installing electrical wires is much easier to do.

This is especially advantageous in the case of machines which have an operator's cab pivotable through 180° (e.g. in case of tractors). When the operator's cab pivots together with the steering wheel/steering shaft, unlike the state of the art no bulky and inflexible hydraulic pipes have to be pivoted as well. Due to the fact that an electrical manual steering signal is generated in the operator's cab, the previous elaborate design is considerably simplified.

In machines with steerable front and rear axles (four wheel steering) twice as many steering cylinders have to be controlled. Use of the steering system according to the invention brings a considerable simplification of design which is otherwise necessitates laying hydraulic pipes.

Another advantage of the steering system according to the invention is that the effects of steering play for the manual steering mode can be reduced substantially to nil.

Moreover the dynamic behavior between the manual steering signal transmitter (e.g. steering wheel) and the steered wheels can be influenced by the use of digital electronics, in particular microprocessors, in the control and analysis device in a simple manner by suitable control and regulating programs.

In this way the steering ratio (ratio of manual adjusting distance and steering cylinder distance/wheel angle displacement) is also easy to adjust and variably adaptable to different operating conditions.

The operational reliability of the steering system is achieved by redundancy of both the electronic control and analysis device and the hydraulic control of the steering cylinder. For this purpose the control and analysis device includes at least two independent control and analysis units and an error detection unit, which are connected to each other for the exchange of results of analysis. At all times only one control and analysis unit is given the right to trigger the electrically operated hydraulic control valve. In case of an error, the faulty control and analysis unit is deactivated by the error detection unit. Furthermore it is provided that the redundant control and analysis units can be accommodated in two autonomous devices with separate power supplies.

Redundancy on the part of hydraulic control of the steering cylinder is provided by two parallel-connected, electrically operated hydraulic control valves to regulate flow of hydraulic fluid to the steering cylinder. Should a breakdown occur in one control valve, for example a blockage of the valve pipe as a result of contaminants in the hydraulic fluid, regulation of the hydraulic flow to the steering cylinder can assumed by the other control valve.

Since the control valve(s) are arranged in the immediate vicinity of the steering cylinder(s) and therefore long hydraulic pipes are eliminated, the risk leakage is reduced.

For forage harvesters with switches as automatic steering signal transmitters for orientation in row crops, the steering system can also include other automatic steering signal transmitters. For example, in accordance with the invention, echo depth sounding or laser direction finding units can be used as automatic steering signal transmitters. Also a high-precision real-time direction finding system (e.g. a satellite navigation system—GPS receiver) may be used for determining the position and direction vector of driving movement and thus serve as an automatic steering signal transmitter. In that case the automatic steering signal nominal value is generated in conjunction with a preplanned digitalized driving route which is stored on a computer system integrated in the machine.

The steering system can also have two or more different automatic steering signal transmitters which can be activated selectively.

BRIEF DESCRIPTION OF THE DRAWINGS

Reference is now made to the drawings which illustrate preferred embodiments of the invention and wherein the same numerals indicate the same parts throughout the several figures.

DETAILED DESCRIPTION

Figure 1:
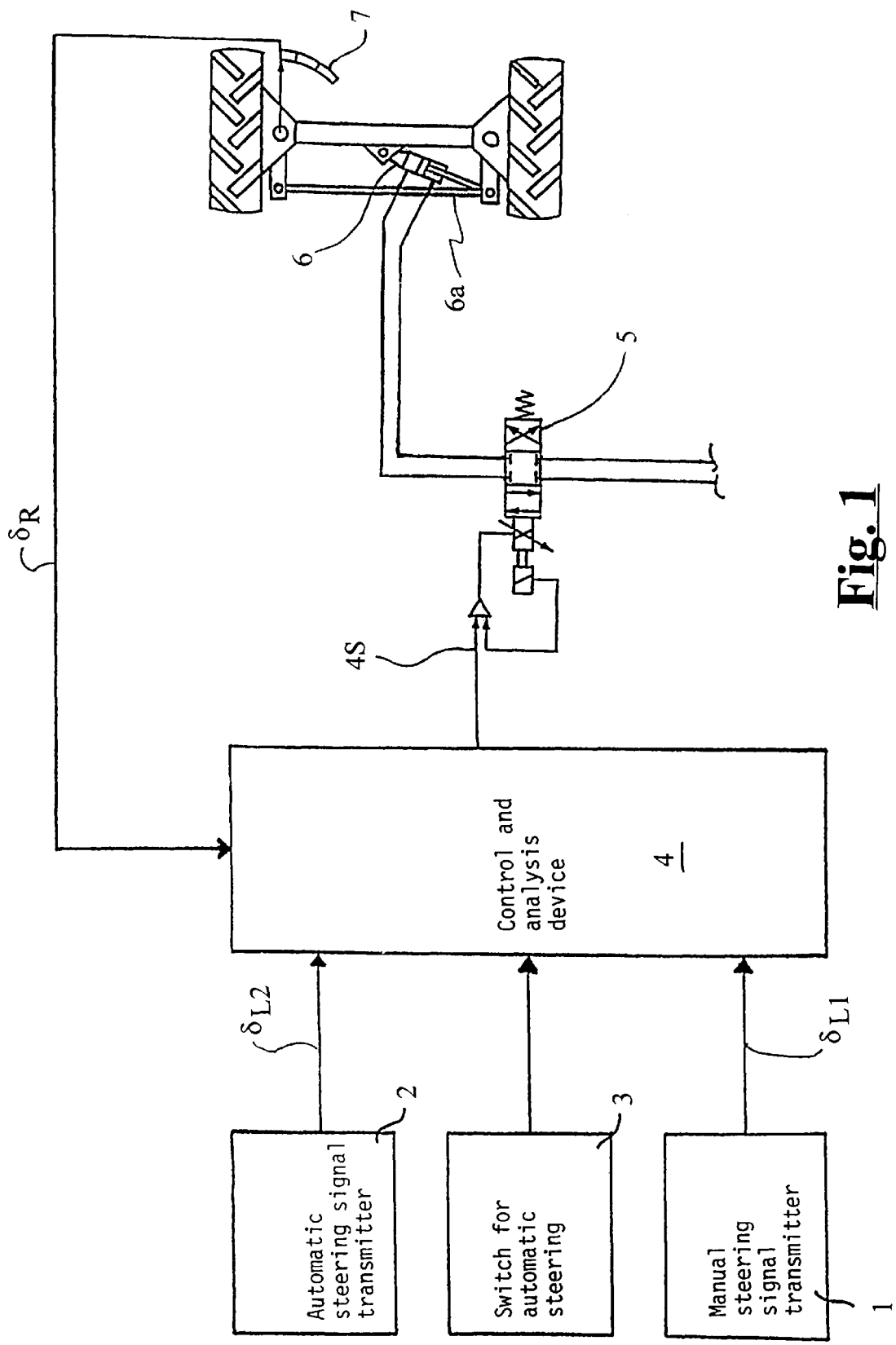
FIG. 1 is a schematic view of a first embodiment of an electrohydraulic steering system.

FIG. 1 shows a first embodiment of a electrohydraulic steering system. For displacement of the steerable wheels there is provided a hydraulic double-acting steering cylinder (6) which displaces both wheels of the steering axle via a tie rod (6a). To measure the wheel angle actual values ($\delta_w$) there is a sensor (7) in the form of an angle transmitter. Admission of hydraulic fluid to the steering cylinder (6) is regulated by an electrically operated hydraulic control valve (5). An electrical trigger signal (4S) for the control valve (5) is generated by a control and analysis device (4) conveniently a microprocessor or microcontroller. The control and analysis device (4) is connected on the input side to a manual steering signal transmitter (1) and an automatic steering signal transmitter (2) which generate the corresponding manual or automatic steering signals ($\delta_{s1}$, $\delta_{s2}$). The control and analysis device (4) also is connected on the input side to a switch (3) with which it is possible to switch between manual and automatic steering modes.

As a precaution, an additional switch (not shown) may be provided for switching to the automatic steering mode.

Further, the control and analysis device (4) is connected to the sensor (7) for reception of the wheel angle actual values ($\delta_w$) From a comparison of the respective wheel angle actual value ($\delta_w$) with the manual or automatic steering signal nominal value ($\delta_{s1}$, $\delta_{s2}$), the control and analysis device (4) determines the electrical trigger signal (4S) for the hydraulic control valve (5).

Whether the manual or automatic steering signal nominal values ($\delta_{s1}$, $\delta_{s2}$) are used to determine the trigger signal (4S), is decided as a function of the position of the switch (3) internally in the control and analysis device (4).

Since the quantity and dynamics of the manually and automatically generated steering signal nominal values can differ from each other, preferably the control and analysis device (4) has two different control algorithms for processing the automatic and manual steering signal nominal values ($\delta_{s1}$, $\delta_{s2}$) The respective algorithm is activated by the position of switch (3). Further, each of the two control algorithms in turn has subalgorithms for different areas of application of the machine; for example, different families of steering characteristics for the steering ratios.

The electrically operated hydraulic control valve (5) is preferably a proportional valve and is here shown as an electrically operated 4/3-way valve. Thus the volume flow to and from the two chambers of the steering cylinder (6) can be adjusted in proportion to the electrical trigger signal (4S).

Figure 4:
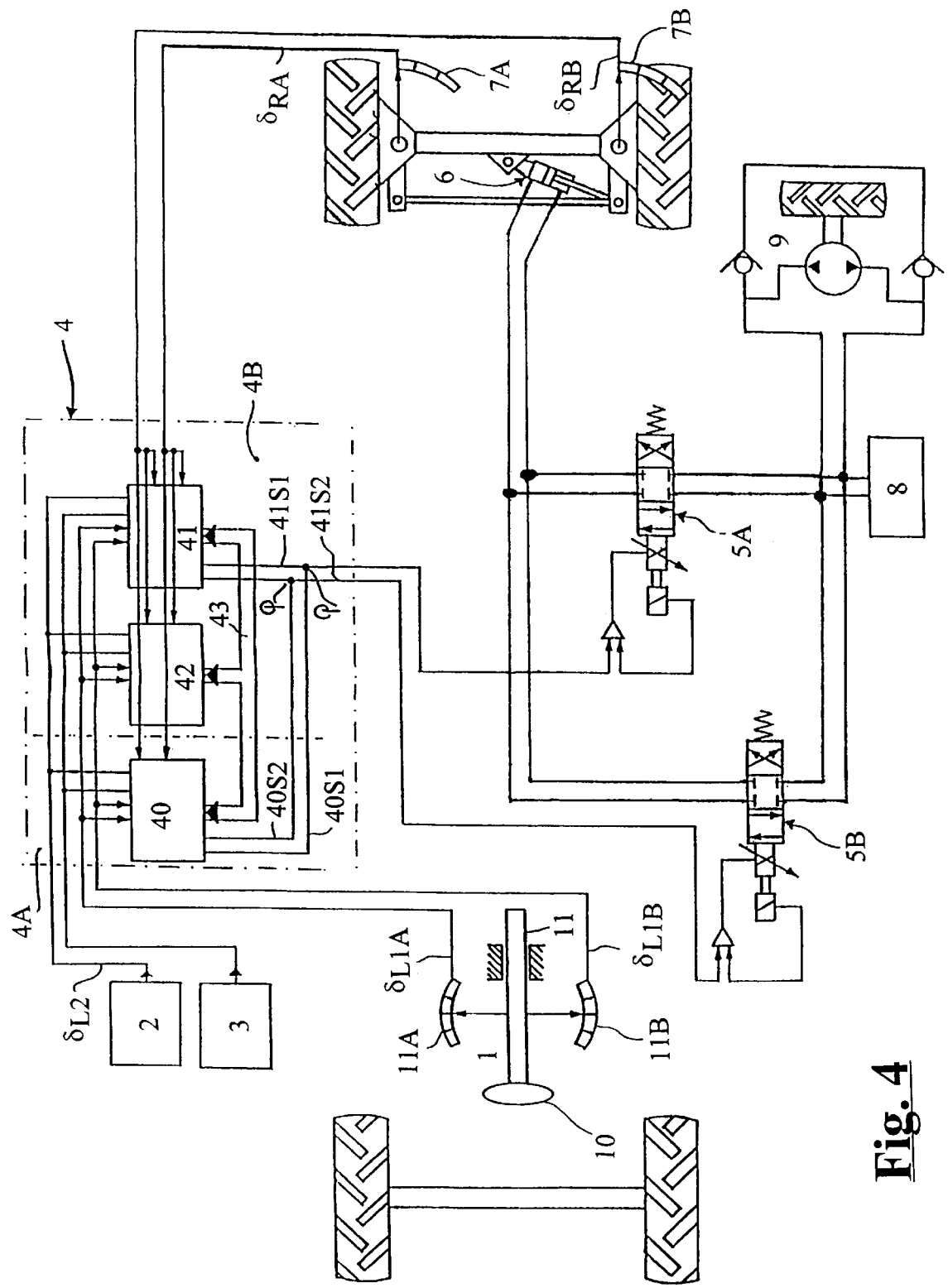
FIG. 4 is a more detailed schematic view of the steering system with a steering axle and only one steering cylinder for displacement of the steerable wheels and two parallel control valves.
Figure 5:
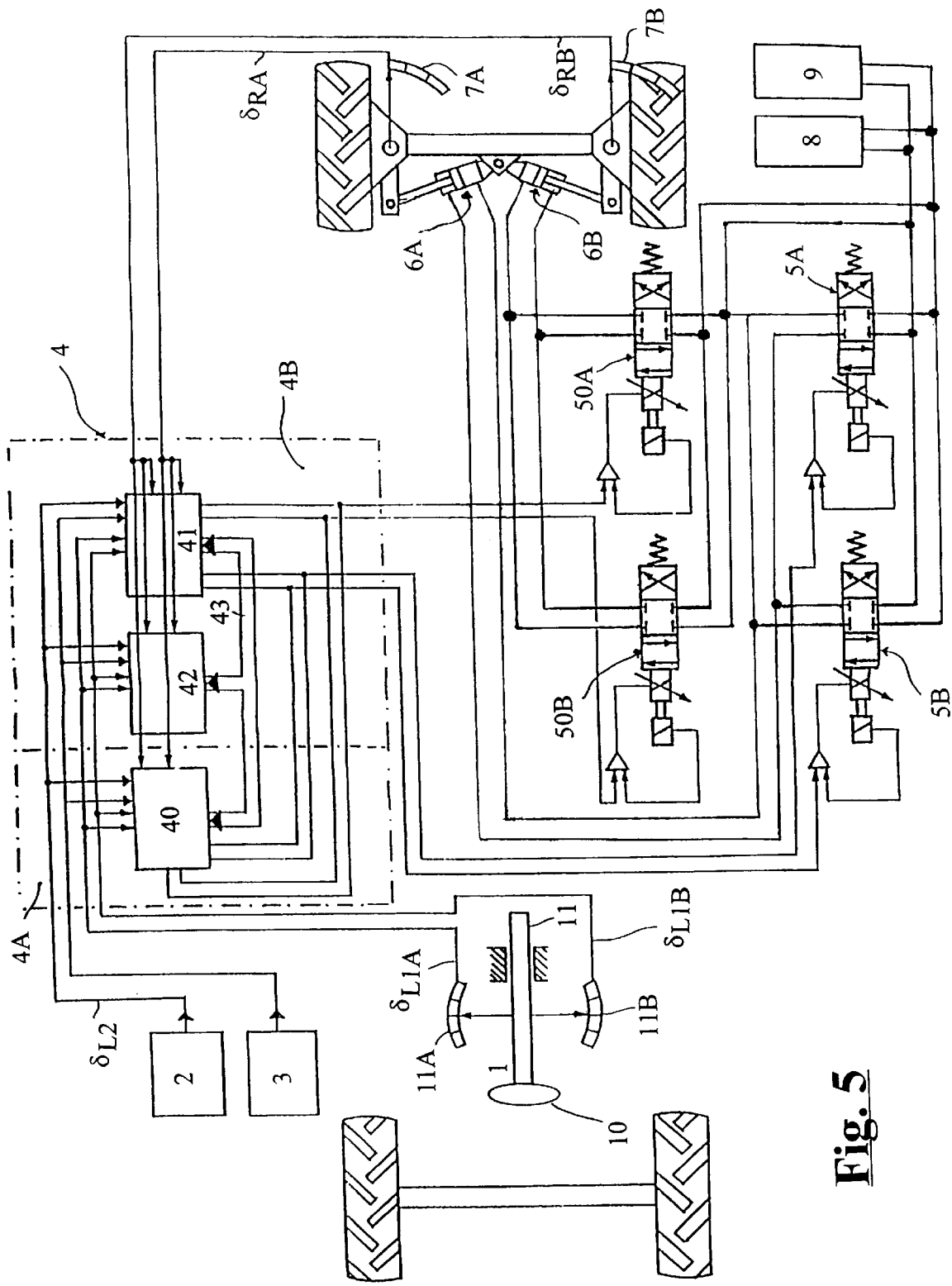
FIG. 5 is a schematic view similar to FIG. 4, but with two steering cylinders which each admit hydraulic fluid via two control valves.

As shown in FIGS. 4 and 5, the manual steering signal transmitter (1) is a steering wheel (10) on whose steering shaft (11) is arranged a sensor (11A, 11B) for steering wheel angle measurement. The sensor (11A, 11B) is formed by a double potentiometer for sensing the steering angle or by an incremental rotary angle transmitter.

On turning the steering wheel (10), the incremental rotary angle transmitter generates pulses which are fed to an electric counter, so that the measured steering angle is available as a digital numerical value. In one variant the incremental rotary angle transmitter transmits its pulses directly to the control and analysis device (4) which then functions as the electric counter. In an alternative variant the electric counter is integrated in the incremental rotary angle transmitter, so that the latter delivers digital values direct to the control and analysis device (4).

The double potentiometer delivers analog voltage values for the measured steering angles. Depending on the design of the control and analysis unit (4), these may be transformed by an analog-to-digital converter to a digital numerical value. Here also there are two variants:

a) the analog-to-digital converter is in the control and analysis device; and b) the analog-to-digital converter is part of the manual steering signal transmitter.

For the control algorithm, associated pairs of steering wheel angle ($\delta_{s1}$, $\delta_{s2}$) and wheel angle ($\delta_w$) can be stored in the control and analysis unit (4) in the form of a table of values.

The control and analysis device (4) is arranged so that, when the automatic steering mode is on, movement of the steering wheel (10) beyond a threshold value deactivates the automatic steering mode and switches to the manual steering mode. Thus the operator can rapidly and spontaneously take control of steering of the machine, overriding the automatic steering mode. This function is possible because the control and analysis device (4) is arranged to continually receive the manually generated steering signal nominal values ($\delta_{s1}$) even when the automatic steering mode is on. Implementation of a monitoring circuit or monitoring program for the manual steering signal nominal values ($\delta_{s1}$) when the automatic steering mode is on, allows switching to the manual mode when a threshold value for the manual steering signal is exceeded. Of course the control and analysis device (4) uses only the automatically generated steering signal nominal values ($\delta_{s2}$) for regulation, but the arrangement allows overriding as described.

Instead of a steering wheel, a steering lever or joystick (not shown) can be advantageously used as a manual steering signal transmitter (1).

Mechanical switches, sonic depth sounding units, laser direction finding units, or real-time direction finding systems (GPS receivers) already mentioned above may be advantageously used as the automatic steering signal transmitter (2).

Figure 2:
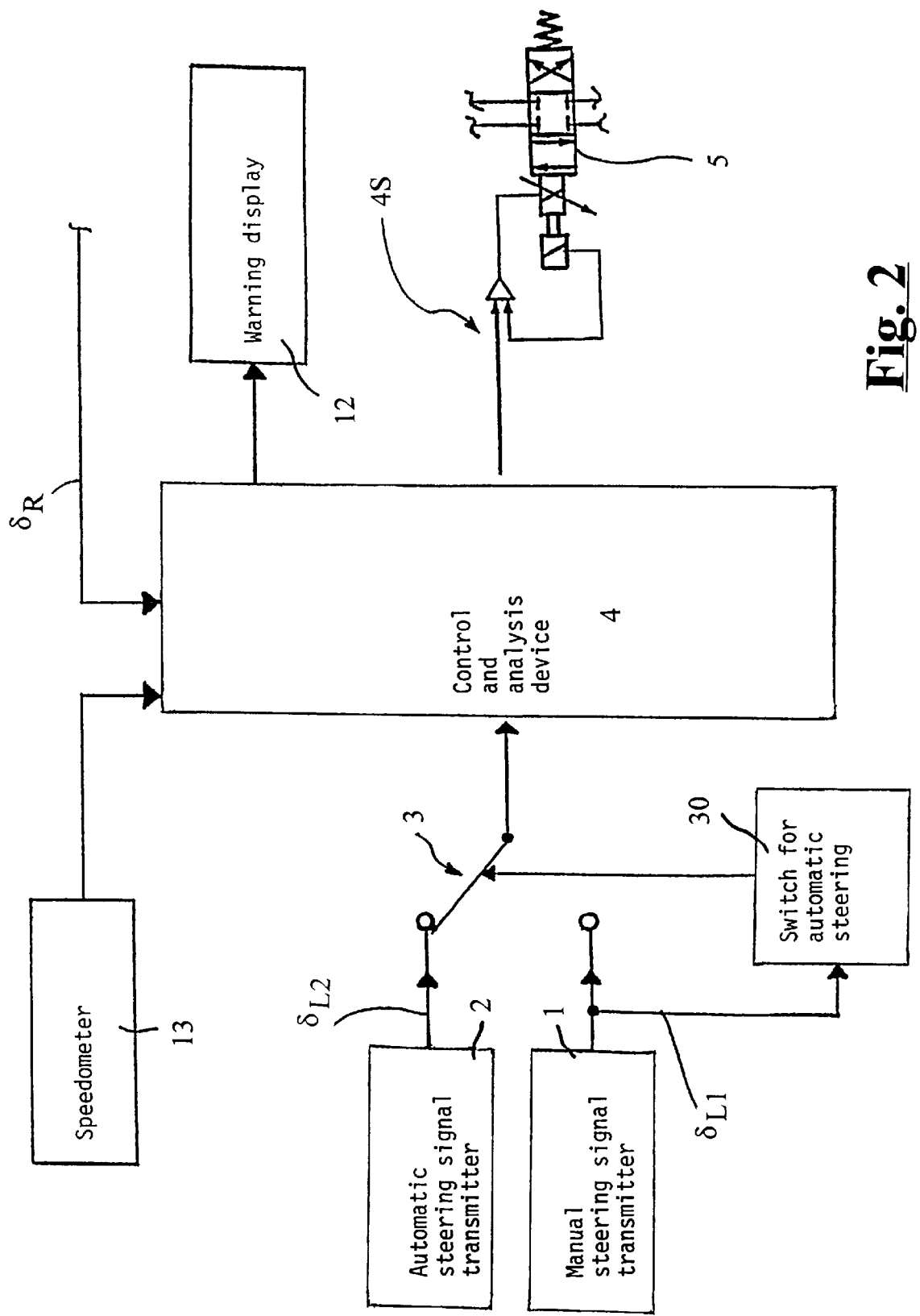
FIG. 2 is a schematic view of another embodiment of the steering system in another embodiment (showing the steering axle has been dispensed with)

In the FIG. 2 embodiment the manual and automatic steering signal nominal values ($\delta_{s1}$ and $\delta_{s2}$, respectively) are not fed simultaneously nor directly to the control and analysis device (4), but selectively via the switch (3). The control and analysis device (4) is informed by the switch position which steering signal nominal values (manual or automatic) it is receiving. The possibility of manually overriding the automatic steering mode is provided by a switch control unit (30) associated with the switch (3) and which monitors the manual steering signal nominal values ($\delta_{s1}$).

Figure 3:
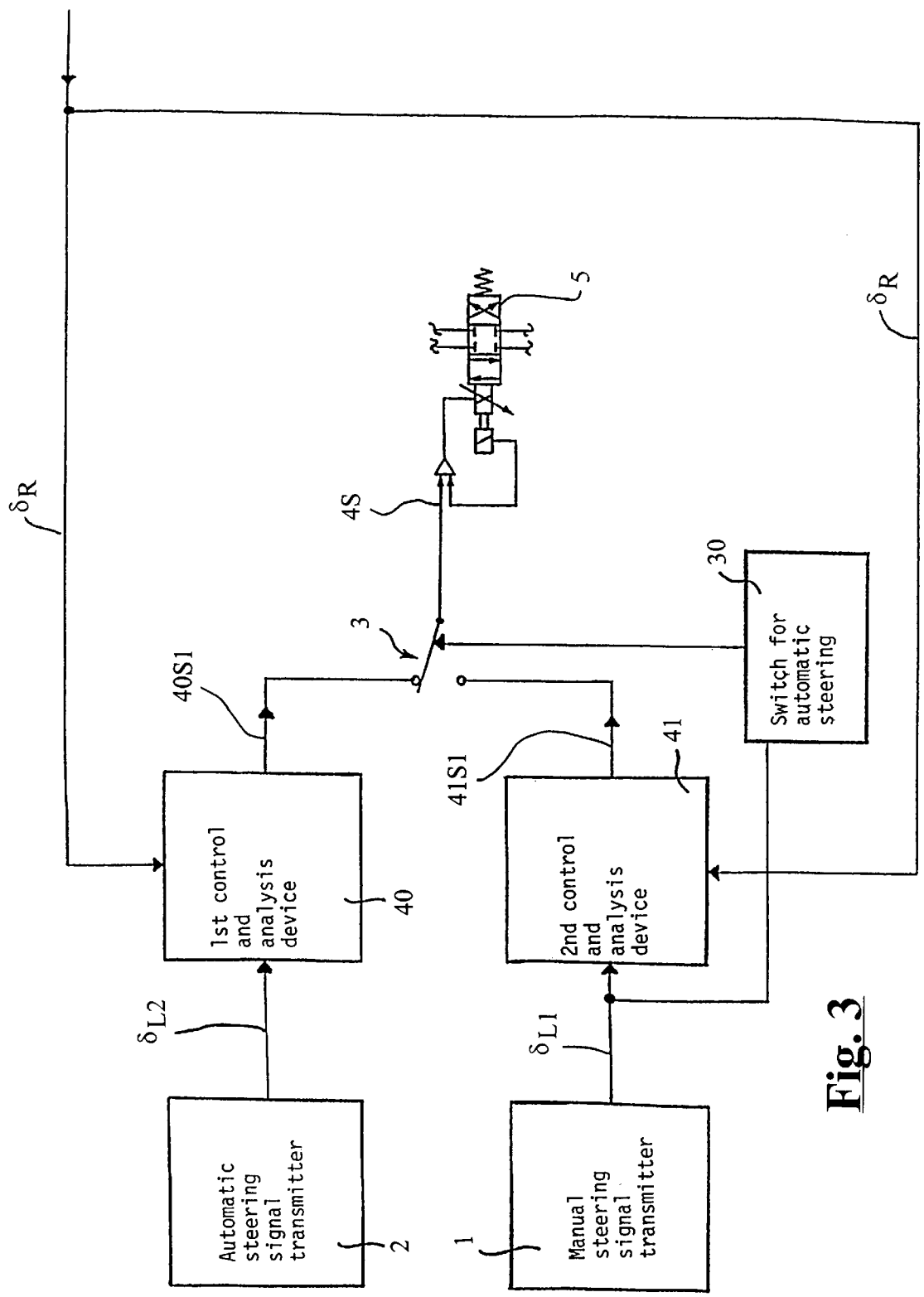
FIG. 3 is a schematic view of the steering system with an electronic control and analysis device for each of the automatic steering signal transmitter and the manual steering signal transmitter.

In the FIG. 3 embodiment, unlike the embodiments of FIGS. 1 and 2, a separate control and analysis device (40 or 41) is provided for each of the manual steering signal transmitter (1) and the automatic steering signal transmitter (2). Switching is then carried out between the trigger signals/outputs ($40_{s1}$ or $41_{s1}$) of the control and analysis devices (40, 41) by the switch (3).

FIG. 4 shows more detail of the electrohydraulic steering system. For redundancy the control and analysis device (4) has two control and analysis units (40, 41) independent of each other and an error detection unit (42). Here each of the units (40, 41 and 42) is fed the automatic and manual steering signal nominal values ($\delta_{s1A}$, $\delta_{s1B}$, $\delta_{s2}$), the wheel angle actual values ($\delta_{wA}$, $\delta_{wB}$) and a signal for the position of the switch (3). Advantageously the control and analysis units (40, 41) as well as the error detection unit (42) each comprise a microprocessor or microcontroller, which are connected to each other by a data bus (43) for exchanging results of analysis. In machines which already have a data bus, it is perceived that this data bus (43) is connected to the machine data bus or even formed by the latter.

By using microcontrollers various control algorithms with adjustable parameters can be implemented in a simple flexible manner by the installation of suitable programs. In this way various steering ratios are also easy to set.

The control and analysis units (40, 41) and the error detection unit (42) are designed as a master and slave assembly. The control and analysis units (40, 41) are the slave controllers; the error detection unit (42) the master controller. By comparing all the results of analysis, a majority decision can then be taken. This is done by cyclic transmission of the results of analysis from the slave controllers (40, 41) to the master controller (42). The master controller (42) has the objective of controlling the signal flow (40S1, 40S2, 41S1, 41S2) to the proportional valve(s) (5A, 5B) and letting only correct trigger signals through to the valve(s) (5A, 5B).

If one of the slave controllers (40, 41) delivers results of analysis outside a predetermined tolerance range, the master controller (42) deactivates this slave controller and switches to the other one. Since simultaneous failure of two controllers is highly unlikely, sufficient precautions are thus taken for the operational reliability of electrical control of the steering system.

Additional reliability is obtained by the fact that a separate control and analysis tool (4A) with independent power supply is provided for the first slave controller (40). For the second slave controller (41) and the master controller (42), in each case additional or a common control and analysis tool (4B) is provided.

Moreover, in addition to the machine battery (not shown) a further accumulator (not shown) is provided for emergency buffering of the controllers.

In the hydraulic part of the steering system additional operational reliability is provided by two parallel-connected proportional valves (5A, 5B) which admit hydraulic fluid to the steering cylinder (6). The two parallel-connected proportional valves (5A, 5B) are each connected to the slave controllers (40, 41) for reception of the trigger signals (40S1, 40S2, 41S1, 41S2).

For reasons of clear representation, the signal wires (40S1, 41S1; 40S2, 41S2) of the two slave controllers (40, 41) which run separately from each other to the proportional valves (5A, 5B) are combined at the points marked "P" in FIG. 4.

In a first variant, triggering of the two proportional valves (5A, 5B) takes place as follows:

a) During normal operation only the first proportional valve (5A) is used to control the hydraulic stream to the steering cylinder (6), while the second proportional valve (5B) is in a shut-off position.

b) In the case of an inadmissible standard deviation that cannot be eliminated, when the analysis results of the redundant controllers (40, 41, 42) tally (i.e. there is no error in the electrical control of the steering system) there is a switching to the second proportional valve (5B). This may occur, for example, when a blockage of the valve pipe cross-section occurs in the first proportional valve (5A) due to contaminants in the hydraulic fluid.

In an alternative variant each of the two proportional valves (5A, 5B) is designed to be able to control the maximum flow of hydraulic fluid necessary in total and they function as follows:

a) During normal operation the two proportional valves (SA, SB) are used simultaneously to control the flow of hydraulic fluid to the steering cylinder (6).

b) If one of the two proportional valves (5A, 5B) breaks down, the other one is accordingly triggered in such a way so as to control the full flow and, thus, compensate for the breakdown.

FIG. 5 shows the FIG. 4 steering system but having a separate steering cylinder (6A, 6B) for each steerable wheel. Accordingly more proportional valves (5A, 5B, 50A, 50B) and trigger wires are provided.

Figure 6:
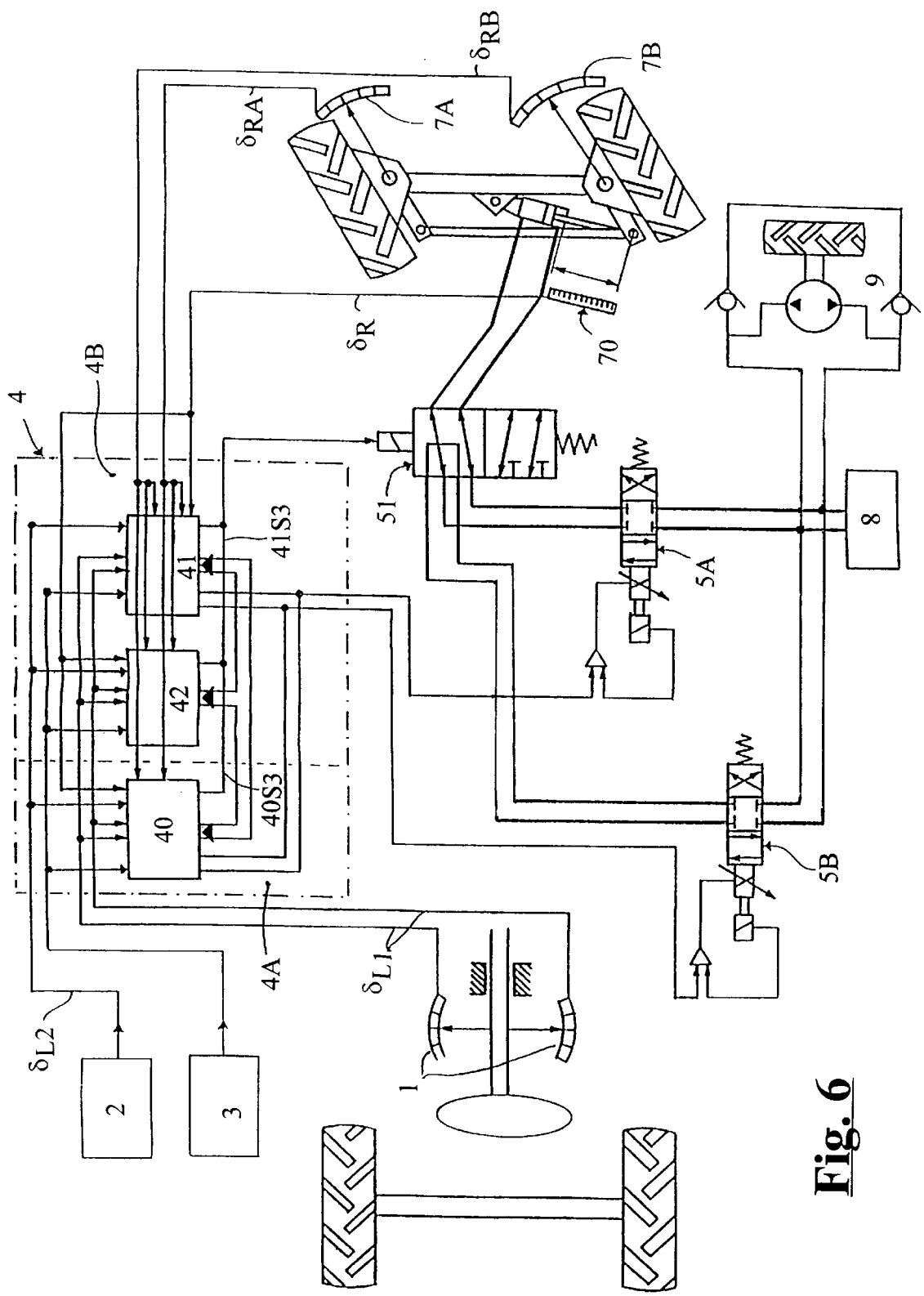
FIG. 6 is a schematic view similar to FIG. 4, but with an additional switching valve which can switch between the two control valves.

In the FIG. 6 steering system, for the parallel-connected proportional valves (5A, 5B) there is provided an additional electrically operated hydraulic switching valve (51) which is likewise connected to the slave controllers (40, 41) for the reception of trigger signals (40S3, 41S3). Thus in case of a breakdown in one of the proportional valves (5A or 5B) the other proportional valve is connected to the steering cylinder (6).

Figure 7:
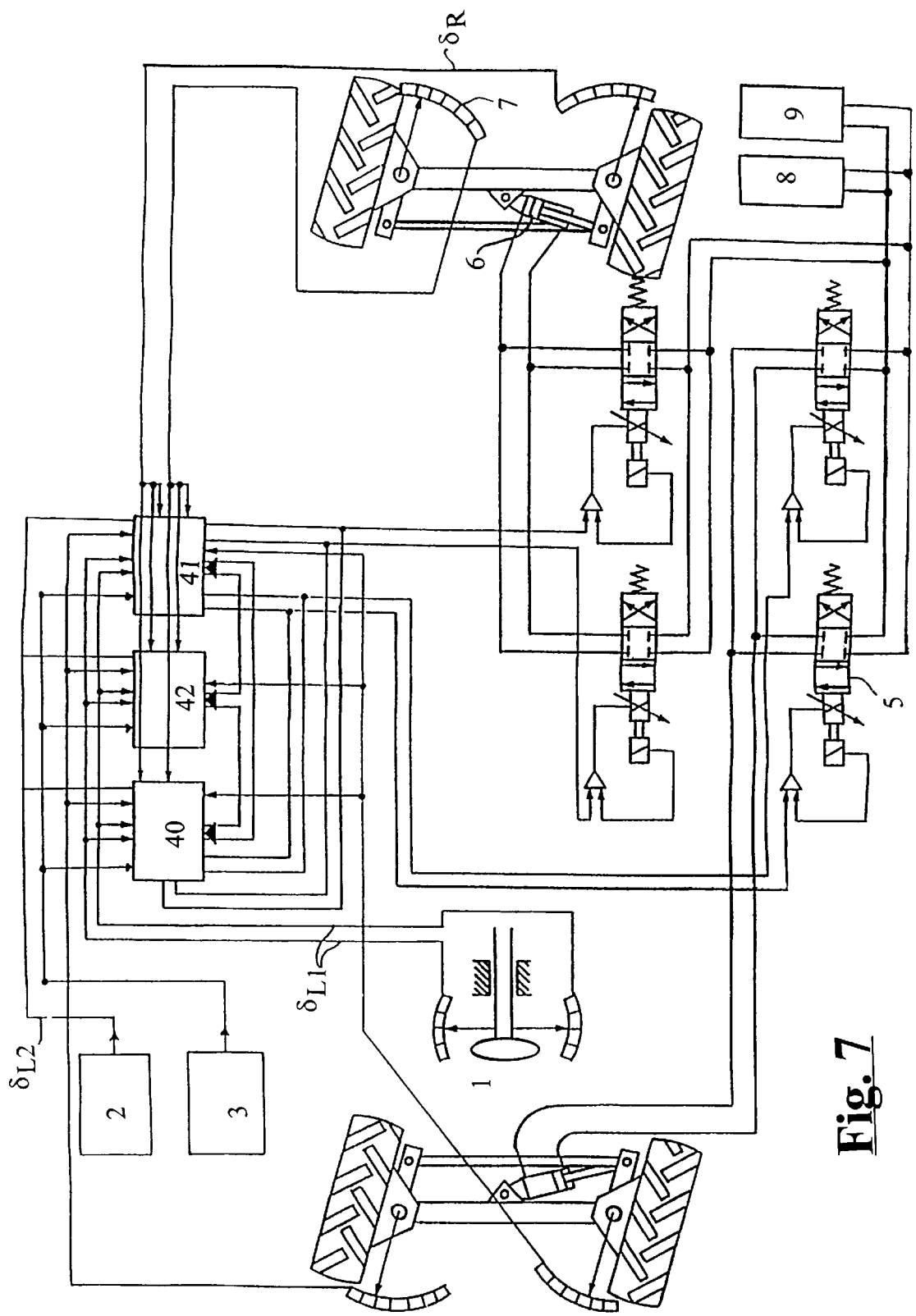
FIG. 7 is a view of the steering system as in FIG. 4, but for a machine with steerable front and rear wheels.

FIG. 7 shows the installation of the steering system in a machine with four wheel steering. With the front and rear wheels turned in the same direction, for example a certain drift of agricultural machines on a slope can be compensated. In a machine with four wheel steering, a separate control and analysis device (40, 41) is preferably provided both for the front wheel steering system and for the rear wheel steering system. The rear wheel steering system can function as the manual steering system and the front wheel steering system as the automatic steering system or vice versa.

Due to the redundancy provided, both with respect to electrical control and to the hydraulic circuit, the machine remains steerable even in case of a breakdown.

To make a breakdown known to the operator, the control and analysis device (4) generates a warning signal (12), shown in FIG. 2. The warning signal can be conveyed to the operator acoustically, optically or by some other possible warning such as e.g. vibration of the steering wheel, individually or in combination.

To preclude damage when a breakdown occurs, restrictions which can vary according to the nature and extent of the breakdown come into force for further operation of the machine due to programming of the control and analysis device (4). One restriction limits the maximum speed of the machine. For this purpose the control and analysis device (4) is connected to the electronic accelerator pedal (not shown) and the speedometer (13) of the machine. Another restriction is that the duration of further operation is reduced to a given reserve time. The operator is thus forced to remedy the damage or seek the nearest repair shop as soon as possible.

The sensor or sensors (7, 7A, 7B, 70A, 70B) for determining the wheel angle actual values ($\delta_w$, $\delta_{wA}$, $\delta_{wB}$) are formed by an angle transmitter arranged on the respective steerable wheel or by a displacement transducer for the path of displacement of the piston of the steering cylinder (6). The presence of two sensors per steering axle increases the reliability in the event of a sensor breakdown.

Referring to FIG. 7, if the pump of the working hydraulics (8) which normally supplies the hydraulic steering system fails, an emergency steering pump (9) is provided. The emergency steering pump (9) consists of a gear pump which is driven by the rotating wheels when the machine is moving.

If the control and analysis device (4) fails completely and not just one of the microprocessors (40, 41), two switches are advantageously provided in the operator's cab for left and right steering. These are connected to the electrically operated hydraulic control valve or valves (5, etc.) directly, bypassing the control and analysis device (4). These valves may, for example, be associated with the rotary angle transmitter (11A, 11B) of the steering wheel (10). Control then takes place by the operation of the switches.

Finally it should also be stated that for security reasons displacement of the manual steering signal transmitter (1) is also not possible during an interruption of operation of the machine when the hydraulic pump (8) is switched off. For this purpose a lock or brake is provided. Furthermore it should be noted that when using an incremental steering signal transmitter there is a reaction only to steering signal variations generated after starting of the hydraulic pump (8).

Other objects, advantages and features of the present invention may be perceived by those skilled in the art or from the appended claims.

I claim:

1. In an electrohydraulic steering system for machines, having steerable wheels, which has manual steering and automatic steering (autopilot) modes which can be selectively activated, and including a hydraulic steering cylinder for displacement of the steerable wheels, a sensor for determining in each case wheel angle actual values for said wheels, means for regulating flow of hydraulic fluid to the steering cylinder, an automatic steering signal transmitter operative in the automatic steering mode for generating electrical steering signal nominal values for the wheel angles, and an electronic control and analysis device for receiving the generated automatic steering signal nominal values and the wheel angle actual values, and therefrom determining an automatic steering mode electrical trigger signal for the hydraulic control valve;

the improvement comprising a manual steering signal transmitter operative in the manual steering mode for sensing a manual steering movement and generating a corresponding manual steering signal nominal value, means for feeding the manual steering signal nominal value to the control and analysis device, and the control and analysis device being arranged for determining, using the wheel angle actual value and the manual steering signal nominal value, a manual steering mode electrical trigger signal for said means for regulating flow of hydraulic fluid to the steering cylinder.

2. An electrohydraulic steering system according to claim 1, wherein the manual steering signal transmitter is formed by a steering wheel with a rotary angle transmitter for measuring the steering wheel angle, the measured steering wheel angle being fed to the control and analysis device as the manually generated electrical steering signal nominal value.

3. An electrohydraulic steering system according to claim 2, wherein the control and analysis device has a table in which associated pairs of steering wheel angle and wheel angle are stored.

4. An electrohydraulic steering system according to claim 2, characterized in that the rotary angle transmitter is constructed as an incremental rotary angle transmitter which integrates the relative variation of the steering wheel to generate the manual steering signal nominal value.

5. An electrohydraulic steering system according to claim 1, wherein the manual steering signal transmitter is incorporated in a joystick.

6. An electrohydraulic steering system according to claim 1, wherein the automatic steering signal transmitter includes a mechanically deflectable switch for orientation when driving in row crops, and wherein the automatic electrical steering signal nominal value is generated by deflection of the switch on contact with the row crop.

7. An electrohydraulic steering system according to claim 1, wherein the automatic steering signal transmitter includes a sonic depth finder for orientation when driving in row crops, and wherein the automatic electrical steering signal nominal value is generated by a sonic depth finder return signal.

8. An electrohydraulic steering system according to claim 1, wherein the automatic steering signal transmitter includes an optical sensor for orientation when driving in row crops, and wherein the automatic electrical steering signal nominal value is generated by an optical signal.

9. An electrohydraulic steering system according to claim 8, wherein the optical sensor is a laser unit.

10. An electrohydraulic steering system according to claim 1, wherein the automatic steering signal transmitter includes a real-time direction finding unit for determining the position and direction vector of driving movement of the machine, and wherein the automatic electrical steering signal nominal value is generated in conjunction with a pre-planned digitalized driving route which is stored in a computer system on the machine.

11. An electrohydraulic steering system according to claim 1, including a switch for selecting the automatic steering mode, and separate signal wires extending between the automatic and the manual steering signal transmitters and the control and analysis device; and wherein the control and analysis device internally selects the automatically or manually generated electrical steering signal nominal values for further processing as a function of the position of the switch.

12. An electrohydraulic steering system according to claim 11, characterized in that when the automatic steering mode is switched on, if a given change occurs in the manually generated steering angle nominal value, the control and analysis device independently deactivates the automatic steering mode and activates the manual steering mode.

13. An electrohydraulic steering system according to claim 1, including a switch for selecting the automatic steering mode, and wherein the automatically and manually generated steering signal nominal values are selectively fed to the control and analysis device via the switch.

14. An electrohydraulic steering system according to claim 13, wherein the switch includes a switch control unit to which the manually generated steering signal nominal value is fed, and wherein, when the automatic steering mode is switched on, if a given change occurs in the manually generated steering angle nominal values, the switch control unit independently switches to the manually generated steering angle nominal values.

15. An electrohydraulic steering system according to claim 1, including a switch having a position for selecting the automatic steering mode, and wherein the control and analysis device has a control algorithm for processing the automatic steering signal nominal values and a different control algorithm for processing the manual steering signal nominal values, and wherein the respective algorithm is activated in accordance with the switch position.

16. An electrohydraulic steering system according to claim 1, including a switch having a position for selecting the automatic steering mode, and wherein the control and analysis device includes a first microprocessor having a first control algorithm for processing the steering signal nominal values of the automatic steering signal transmitter and a second microprocessor having a second control algorithm for processing the steering signal nominal values of the manual steering signal transmitter, and wherein depending on the position of the switch the electrical trigger signal of either the first or the second microprocessor is used to trigger the hydraulic control valve.

17. An electrohydraulic steering system according to claim 15, characterized in that the control algorithms for the manual and automatic steering each have multiple subalgorithms for different applications and which include a family of steering characteristics with different steering ratios.

18. An electrohydraulic steering system according to claim 1, wherein the control and analysis device includes an error detection unit, and first and second control and analysis units independent of each other; said units being arranged to each receive the steering signal nominal values, and the wheel angle actual values; and the control and analysis units being connected to the error detection unit for the exchange of analysis results, and in case of an error the erroneous control and analysis unit being deactivated by the error detection unit.

19. In an electrohydraulic steering system for machines, having steerable wheels, which has manual steering and automatic steering (autopilot) modes which can be selectively activated, and including a hydraulic steering cylinder for displacement of the steerable wheels, a sensor for determining in each case wheel angle actual values for said wheels, means for regulating flow of hydraulic fluid to the steering cylinder, an automatic steering signal transmitter operative in the automatic steering mode for generating electrical steering signal nominal values for the wheel angles, and an electronic control and analysis device for receiving the generated automatic steering signal nominal values and the wheel angle actual values, and therefrom determining an automatic steering mode electrical trigger signal for the hydraulic control valve;

the improvement comprising a manual steering signal transmitter operative in the manual steering mode for sensing a manual steering movement and generating a corresponding manual steering signal nominal value, means for feeding the manual steering signal nominal value to the control and analysis device, and the control and analysis device being arranged for determining, using the wheel angle actual value and the manual steering signal nominal value, a manual steering mode electrical trigger signal for said means for regulating flow of hydraulic fluid to the steering cylinder, and wherein the control and analysis device includes an error detection unit, and first and second control and analysis units independent of each other; said units being arranged to each receive the steering signal nominal values, and the wheel angle actual values; and the control and analysis units being connected to the error detection unit for the exchange of analysis results, and in case of an error the erroneous control and analysis unit being deactivated by the error detection unit, the steering system having a first separate control and analysis tool having an independent power supply provided for the first control and analysis unit, and having a second control and analysis tool having a separate independent power supply provided for the second control and analysis unit and the error detection unit together.

20. An electrohydraulic steering system according to claim 18, wherein the machine includes a battery, and independently of the battery an accumulator for emergency buffering of the control and analysis units and the error detection unit.

21. An electrohydraulic steering system according to claim 18, including a data bus for interconnecting the control and analysis units and the error detection unit.

22. An electrohydraulic steering system according to claim 21, wherein the data bus is a data bus for diagnostic purposes and for the reception and transmission of data, including travel speed.

23. An electrohydraulic steering system according to claim 21, characterized in that each of the control and analysis units and the error detection unit include a microprocessor, and which microprocessors are interconnected by said data bus.

24. An electrohydraulic steering system according to claim 1, wherein the means for regulating flow of hydraulic fluid to the steering cylinder includes two parallel-connected, electrically operated hydraulic control valves each connected to the control and analysis device for reception of the trigger signals and thereby regulating flow of hydraulic fluid to the steering cylinder.

25. An electrohydraulic steering system according to claim 24, wherein one of the two control valves controls the flow of hydraulic fluid to the steering cylinder, while the other of the two control valves is in a shut-off position, and wherein the control and analysis device is operative to switch flow control to the said other of the two control valves in the event of an inadmissible deviation from standard.

26. An electrohydraulic steering system according to claim 24, wherein each of the two control valves is designed for controlling the total maximum flow of hydraulic fluid to the steering cylinder, wherein during normal operation both of the two control valves cooperate for controlling the flow of hydraulic fluid to the steering cylinder, and wherein in the event that one of the two control valves has a breakdown, the control and analysis device is operative to switch entire flow control to the other of the two control valves so that the breakdown is compensated for in the other of the two control valves.

27. An electrohydraulic steering system according to claim 1, wherein the means for regulating flow of hydraulic fluid to the steering cylinder includes two parallel-connected, electrically operated hydraulic control valves, and an additional electrically operated hydraulic switching valve connected to the control and analysis device for reception of a trigger signal, and wherein the switching valve selectively interconnects one of the said two control valves to the steering cylinder to regulate the flow of hydraulic fluid to the steering cylinder.

28. An electrohydraulic steering system according to claim 24, wherein the electrically triggerable hydraulic control valves are proportional valves.

29. An electrohydraulic steering system according to claim 28, wherein the proportional valves include a feedback for correcting the variable of the valve slide.

30. An electrohydraulic steering system according to claim 1, characterized in that the steering system has electrical wires including supply wires, which supply wires are of dual construction.

31. An electrohydraulic steering system according to claim 1, wherein the control and analysis device is arranged to generate a warning signal whenever a breakdown occurs.

32. An electrohydraulic steering system according to claim 31, characterized in that the warning signal is an optical signal.

33. An electrohydraulic steering system according to claim 31, characterized in that the warning signal is an acoustical signal.

34. An electrohydraulic steering system according to claim 31, characterized in that the warning signal is a vibratory signal.

35. An electrohydraulic steering system according to claim 1, including means under control of the control and analysis device for limiting further operation of the machine when a breakdown occurs.

36. A machine incorporating an electrohydraulic steering system according to claim 35, the machine including a speedometer for sensing its speed, and means for feeding a signal correlative to the machine speed to the control and analysis device which, in the event of a breakdown in the steering system, restricts the maximum machine speed.

37. A machine according to claim 36, including a drive transmission, and wherein the control and analysis device down shifts the drive transmission or locks the drive transmission in a selected ratio in the event of a breakdown in the steering system.

38. A machine according to claim 36, including means for accelerating the machine, and means under control of the control and analysis device for restricting the accelerating means to thereby restrict the maximum machine speed.

39. An electrohydraulic steering system according to claim 35, characterized in that when a breakdown occurs, the control and analysis device restricts the duration of further operation of the machine to a selected period of time.

40. An electrohydraulic steering system according to claim 1, characterized in that the sensor for determining the wheel angle actual values is formed by at least one angle transmitter arranged on the steerable wheels.

41. An electrohydraulic steering system according to claim 1, characterized in that the sensor for determining the wheel angle actual values is formed by at least one displacement transducer for sensing displacement of the steering cylinder piston.

42. An electrohydraulic steering system according to claim 1, characterized in that the sensor for determining the wheel angle actual values includes an angle transmitter arranged on the steerable wheel and a displacement transducer for sensing displacement of the steering cylinder piston.

43. An electrohydraulic steering system according to claim 1, including means for inhibiting the displacement of the manual steering signal transmitter during an interruption of operation of the machine when the flow of hydraulic fluid is off.

44. An electrohydraulic steering system according to claim 1, wherein the manual steering signal transmitter is an incremental signal transmitter so arranged that during an interruption of operation of the machine when the flow of hydraulic fluid is off, a displacement of the incremental signal transmitter produces no variation in the steering signal nominal values, whereby after starting the flow of hydraulic fluid there is a reaction only to variations of the steering signal nominal values which then occur.

45. An electrohydraulic steering system according to claim 1, including a steering pump for supplying hydraulic fluid to the steering system, and an emergency steering pump for use when the steering pump fails.

46. A machine incorporating an electrohydraulic steering system according to claim 1, including front and rear wheels, a second control and analysis device, and wherein one control and analysis device controls steering for the front wheels and the other control and analysis device controls steering for the rear wheels.

47. A machine according to claim 46, wherein one set of wheels is operable in the manual steering mode while the other set of wheels is operable in the automatic steering mode.

48. An electrohydraulic steering system according to claim 1, including two switches for left and right steering directly connected to the electrically operated hydraulic control valve to bypass the control and analysis device in the event of failure thereof so that steering is possible.

49. An electrohydraulic steering system according to claim 48, characterized in that the switches for left and right steering are operated by the manual steering signal transmitter.

50. An electrohydraulic steering system for machines, having steerable wheels, which have manual steering and automatic steering modes which can be selectively activated, and including

- a hydraulic steering cylinder for displacement of the steerable wheels, a sensor for determining wheel angle actual values for said wheels, means for regulating flow of hydraulic fluid to the steering cylinder, and an electronic control and analysis device;
- a manual steering signal transmitter operative in the manual steering mode for sensing a manual steering movement and generating a corresponding manual steering signal nominal value, means for feeding the manual steering signal nominal value to the control and analysis device, and the control and analysis device being arranged for determining, using the wheel angle actual value and the manual steering signal nominal value, a manual steering mode electrical trigger signal for said means for regulating flow of hydraulic fluid to the steering cylinder;
- an automatic steering signal transmitter operative in the automatic steering mode for generating electrical steering signal nominal values for the wheel angles, means for feeding the automatic steering signal nominal values to the control and analysis device, and the electronic control and analysis device being arranged for determining, using the automatically generated steering signal nominal values and the wheel angle actual values, an automatic steering mode electrical trigger signal for the hydraulic control valve.

* * * * *